United States Patent
Luan et al.

(10) Patent No.: US 10,769,080 B2
(45) Date of Patent: Sep. 8, 2020

(54) DISTRIBUTED AND SHARED MEMORY CONTROLLER

(71) Applicant: Futurewei Technologies, Inc., Plano, TX (US)

(72) Inventors: Hao Luan, Plano, TX (US); Alan Gatherer, Richardson, TX (US); Xi Chen, Plano, TX (US); Fang Yu, San Jose, CA (US); Yichuan Yu, Shanghai (CN); Bin Yang, Shanghai (CN); Wei Chen, Shanghai (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/942,065

(22) Filed: Mar. 30, 2018

(65) Prior Publication Data

US 2018/0285290 A1   Oct. 4, 2018

Related U.S. Application Data

(60) Provisional application No. 62/479,115, filed on Mar. 30, 2017, provisional application No. 62/515,416, filed on Jun. 5, 2017.

(51) Int. Cl.
*G06F 13/16* (2006.01)
*G06F 13/40* (2006.01)
*G06F 13/42* (2006.01)

(52) U.S. Cl.
CPC ...... *G06F 13/1668* (2013.01); *G06F 13/4022* (2013.01); *G06F 13/4068* (2013.01); *G06F 13/42* (2013.01)

(58) Field of Classification Search
CPC ............ G06F 13/1668; G06F 13/4022; G06F 13/4068; G06F 13/42
USPC ....................................................... 710/110
See application file for complete search history.

(56) References Cited

U.S. PATENT DOCUMENTS

| | | | | |
|---|---|---|---|---|
| 5,781,702 A * | 7/1998 | Alhalabi | ................... | G06N 3/02 706/27 |
| 6,021,442 A * | 2/2000 | Ramanan | ............ | G06F 13/4022 709/227 |
| 6,240,096 B1 * | 5/2001 | Book | .................... | H04L 49/357 370/382 |
| 6,539,488 B1 * | 3/2003 | Tota | .......................... | G06F 5/06 710/305 |

(Continued)

*Primary Examiner* — Christopher B Shin
(74) *Attorney, Agent, or Firm* — Slater Matsil, LLP

(57) ABSTRACT

A distributed and shared memory controller (DSMC) comprises at least one building block. comprising a plurality of switches distributed into a plurality of stages; a plurality of master ports coupled to a first stage of the switches; and a plurality of bank controllers with associated memory banks coupled to a last stage of the switches; wherein each of the switches connects to lower stage switches via internal connections, each of the switches of the first stage connects to at least one of the master ports via master connections and each of the switches of the last stage connects to at least one of the bank controllers via memory connections; wherein each of the switches of the first stage connects to second stage switches of a neighboring building block via outward connections and each of the switches of a second stage connects to first stage switches of the neighboring building block via inward connections.

16 Claims, 12 Drawing Sheets

(56) References Cited

U.S. PATENT DOCUMENTS

| | | | | |
|---|---|---|---|---|
| 6,819,671 B1* | 11/2004 | Chen | | H04L 49/351 370/389 |
| 7,079,525 B1* | 7/2006 | Goldstein | | H04L 49/101 370/352 |
| 7,533,256 B2* | 5/2009 | Walter | | H04L 63/0428 370/389 |
| 7,865,654 B2* | 1/2011 | Pettey | | G06F 13/4022 370/351 |
| 7,983,192 B2* | 7/2011 | Ghaibeh | | H04L 45/00 370/254 |
| 8,051,238 B2* | 11/2011 | Rhee | | G06F 13/4022 710/316 |
| 8,327,114 B1* | 12/2012 | Cismas | | G06F 11/1423 712/11 |
| 8,327,187 B1* | 12/2012 | Metcalf | | G06F 9/5022 714/10 |
| 9,160,686 B2* | 10/2015 | Boduch | | H04L 49/1523 |
| 9,219,617 B2* | 12/2015 | Newton | | H04L 12/4641 |
| 9,397,834 B2* | 7/2016 | Walrath | | G06F 21/72 |
| 9,658,403 B2* | 5/2017 | Mehrvar | | G02B 6/3546 |
| 2001/0030942 A1* | 10/2001 | Suzuki | | H04L 49/101 370/228 |
| 2002/0087813 A1* | 7/2002 | Harris | | G06F 9/5016 711/148 |
| 2004/0156361 A1* | 8/2004 | Shimizu | | H04L 49/3072 370/389 |
| 2006/0029058 A1* | 2/2006 | Reed | | H04L 12/18 370/388 |
| 2006/0056290 A1* | 3/2006 | Hass | | H04L 47/24 370/229 |
| 2006/0171234 A1* | 8/2006 | Liu | | G11C 7/1018 365/230.03 |
| 2006/0209899 A1* | 9/2006 | Cucchi | | H04Q 11/04 370/498 |
| 2010/0272117 A1* | 10/2010 | Wu | | H04L 49/101 370/413 |
| 2012/0127818 A1* | 5/2012 | Levy | | G06F 13/16 365/230.03 |
| 2014/0181985 A1* | 6/2014 | Mamidwar | | G06F 21/10 726/26 |
| 2015/0106821 A1* | 4/2015 | Chang | | G06F 9/5061 718/104 |
| 2015/0262057 A1* | 9/2015 | Modha | | G06N 3/04 706/29 |
| 2016/0034310 A1* | 2/2016 | Garg | | G06F 9/5027 718/104 |
| 2016/0351268 A1* | 12/2016 | Tran | | G11C 16/30 |
| 2017/0147509 A1* | 5/2017 | Nevers | | G06F 12/1009 |
| 2018/0181336 A1* | 6/2018 | Lovelace | | G06F 9/445 |
| 2018/0287963 A1* | 10/2018 | Cheng | | H04L 49/101 |

* cited by examiner

DISTRIBUTED AND SHARED MEMORY CONTROLLER

CROSS-REFERENCE TO RELATED APPLICATIONS

This application claims priority to U.S. provisional patent application Ser. No. 62/479,115, filed on Mar. 30, 2017 and entitled "System and Method for Hierarchical Speedups to Improve Utilization and Throughput of a Shared Memory Controller" and priority of U.S. provisional patent application Ser. No. 62/515,416, filed on Jun. 5, 2017 and entitled "Distributed and Shared Memory Controller," which are cooperated herein by reference as if reproduced in their entireties.

BACKGROUND

Multi-core SoC (System on Chip), including NoC (Network on Chip) is a system or network with two or more independent processor cores. Many core SoC comprises even more processor cores and is designed for a high degree of parallel processing. Many core SoC may comprise a larger number of independent processor cores (e.g. 10s, 100s, or 1,000s) compared with multi-core. Many core are used extensively in embedded computers and high-performance computing.

For multi-core and many core SoC (System on Chip), including NoC (Network on Chip), it is very common to employ one or more shared memory bank controller(s) on chip where many masters work together with the same shared data/information. Shared memory thus is a key component, and its efficiency and performance directly affect the overall SoC performance.

Many core SoC, including NoC, quickly takes over multi-core as the mainstream for the semiconductor industry by taking the advantages of the ever shrinking semiconductor geometry and more parallelism enabled system and software implementation. To efficiently harvest the performance gains enabled by many core SoC/NoC, a high efficient shared memory controller become an imperative requirement. The more masters, such as Central Processing Unit (CPU)/Digital Signal Processing (DSP) cores, hardware accelerators, data movement agent (DMA), could access a shared memory controller with good quality of service (QoS), the better overall performance we would obtain from system perspective. However in reality, the more masters try to share a common memory, the worse QoS would be observed with conventional architecture.

SUMMARY

This invention has achieved much better access latency, smaller area and almost the same power compared with the conventional implementation. Also this architecture could easily scale out to support more masters with extra linear costs and minimal degradation of the performance.

According to one aspect of the present disclosure, a distributed and shared memory controller (DSMC) is introduced. The DSMC comprises at least one building block. Wherein the at least one building block comprises a plurality of switches distributed into a plurality of stages; a plurality of master ports coupled to a first stage of the plurality of switches; and a plurality of bank controllers with associated memory banks coupled to a last stage of the plurality of switches; wherein each of the plurality of switches connects to lower stage switches via internal connections, each of the plurality of switches of the first stage connects to at least one of the plurality of master ports via master connections and each of the plurality of switches of the last stage connects to at least one of the plurality of bank controllers via memory connections; wherein each of the plurality of switches of the first stage connects to second stage switches of a neighboring building block via outward connections and each of the plurality of switches of a second stage connects to first stage switches of the neighboring building block via inward connections.

In one implementation, the plurality of switches comprises radix-N switches, and N is a number of power of 2.

In one implementation, the last stage of the plurality of the switches is radix-2 switches.

In one implementation, 1, wherein the internal connections between the plurality of switches of the last stage and the plurality of switches of a penultimate stage has no wire crossing among each other.

In one implementation, the internal connections has only one level wire crossing among each other.

In one implementation, the master connections, the outward connections and the inward connections have same bandwidth and the internal connections and the memory connections have same bandwidth.

In one implementation, wherein the bandwidth of the internal connections and the memory connections are M times of the bandwidth of the master connections, the outward connections and the inward connections, wherein M is a number of the at least one building block.

In one implementation, the inward connections and the outward connections from the at least one building block merge to at least one connection.

In one implementation, the memory connections have more bandwidth than the internal connections which have more bandwidth than at least one of the master connections, the outward connections, or the inward connections.

In one implementation, each of the memory banks has an address comprising a building block subfield and a memory bank subfield.

In one implementation, the at least one building block comprises a plurality of masters connected to the plurality of master ports.

In one implementation, the DSMC comprising a command scanner configured to scramble a request address of a request so that the request can be distributed among the building blocks.

In one implementation, the command scanner is further configured to compress a plurality of beats in the request for multi-beat burst.

In one implementation, the command scanner scrambles the request address by exchanging a number of L most significant bits (MSB) of the request address with the number of L least significant bits (LSB) of the request address.

In one implementation, the DSMC comprises a number of $2^L$ building blocks.

In one implementation, the number of L LSB is further reversed after exchanging with the number of L MSB.

In one implementation, the DSMC comprises a plurality of building blocks, wherein each of the plurality of building blocks has a same number of master ports, a same number of memory banks and a same number of switches.

In one implementation, the DSMC comprises a plurality of building blocks, wherein at least two of the plurality of building blocks has different number of master ports.

In one implementation, the DSMC comprises a plurality of building blocks, wherein at least two of the plurality of building blocks has different number of bank controllers.

In one implementation, the DSMC comprises a plurality of building blocks, wherein at least two of the plurality of building blocks has different number of switches.

In one implementation, a number of the plurality of master ports in the at least one building block is different from a number of the plurality of bank controllers in the at least one building block.

According to another aspect of the present disclosure, a method for forming a DSMC is introduced. The method comprises forming at least one building block comprising a plurality of switches distributed into a plurality of stages; a plurality of master ports coupled to a first stage of the plurality of switches; and a plurality of bank controllers with associated memory banks coupled to a last stage of the plurality of switches; connecting each of the plurality of switches to lower stage switches via internal connections; connecting each of the plurality of switches of the first stage to at least one of the plurality of master ports via master connections; connecting each of the plurality of switches of the last stage to at least one of the plurality of bank controllers via memory connections; connecting each of the plurality of switches of the first stage to second stage switches of a neighboring building block via outward connections; and connecting each of the plurality of switches of a second stage to first stage switches of the neighboring building block via inward connections.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The goal of this study is to observe and address design and implementation pain points of the current shared memory solution, predict, identify key architecture changes and provide proposals for the next generation of SoC/NoC. Out of many challenges it addresses, heavy parallelism brought by 5G technologies is given the highest priority.

A shared memory controller could be shared by 32 or 64 masters. More masters, such as 128 or 256 can also be supported by the present disclosure. The Masters could be heterogonous or homogenous. Wherein the control logics may run at the same speed as that of the masters. The memory may run at the same speed as that of the control logics. The memory may also run at different speed synchronously or asynchronously depend on the real overall system requirements and limitation of the implementation. Disclosed herein is a Distributed and Shared Memory Controller (DSMC) with building blocks. With the presented DSMCs, a better access latency than that of existing solution with same number of masters can achieve.

Figure 1:
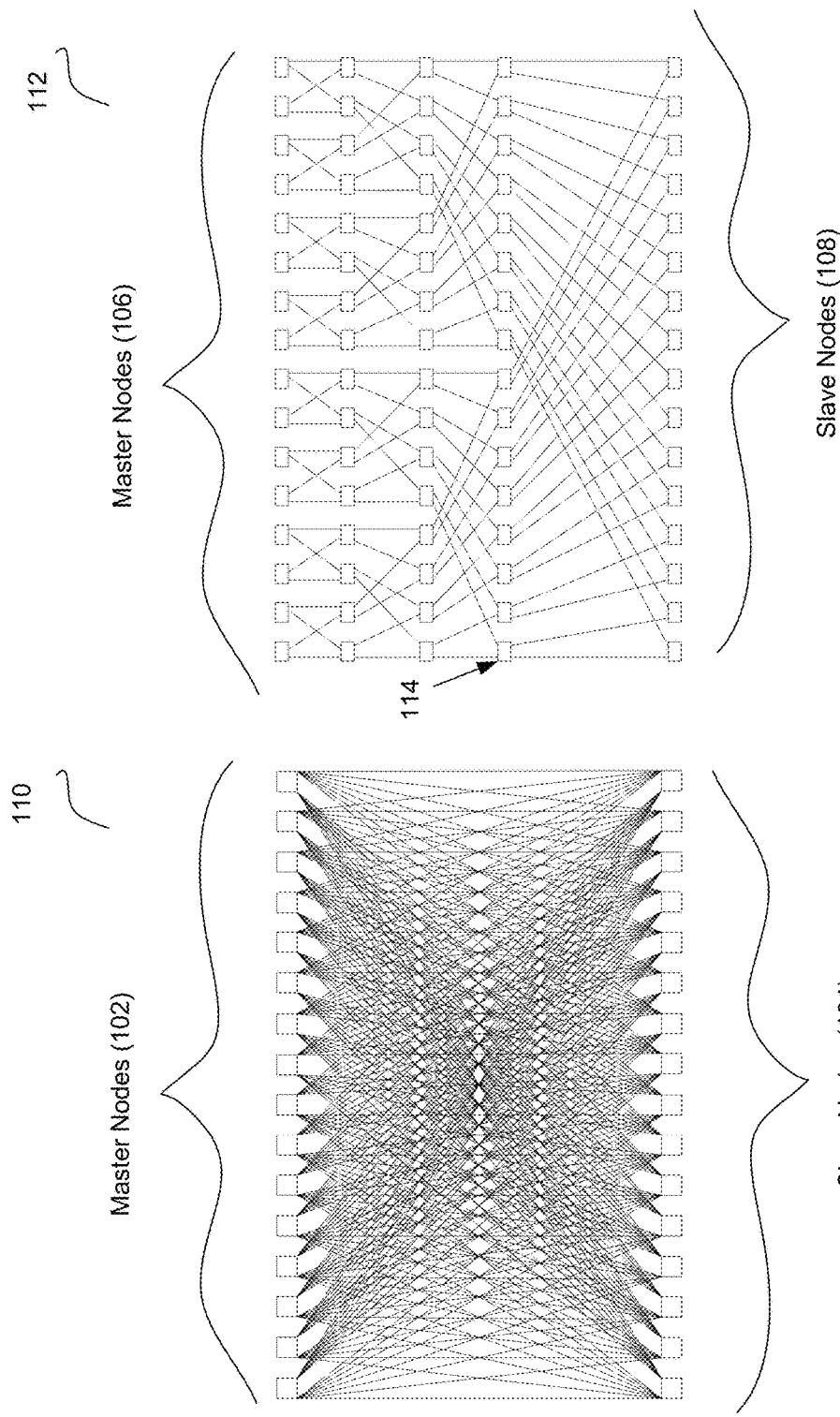
FIG. 1 is a diagram showing a comparison of a conventional memory controller and a DSMC according to the present disclosure.

FIG. 1 is a comparison of the conventional memory controller and the DSMC of the present disclosure. Interconnect network connects multiple masters and many shared bank controllers. The left portion of FIG. 1 is the conventional memory controller. It can be seen that the conventional memory controller has very complex and jumble layout. When there are many requesting masters to send read and write requests to the shared memory, the interconnect between requesting masters and memory banks could be heavily congested with many outstanding regular and linear memory accesses inside of the interconnect. This scenario negatively impacts the QoS of all masters and overall shared memory utilization. Also, the more wire crosses over, the more congested it will be for the routing area. From the left portion of FIG. 1, the arrangement is disordered and the connection between each of the M master nodes 102 (or master ports) and the M slave nodes 104 (or bank controller ports) are 1 to M (M=16 in FIG. 1) with many crossing. For a memory controller of 64 masters, the connections should be 64*64=4096. Wherein each connection may represent multiple wires, for example, hundreds of wires. The number of wires of each connection is related with the bit width of the bus interface. Usually, each connection includes at least five hundred of wires.

However, the DSMC disclosed in the present disclosure has a much more organized layout with multiple building blocks, which makes the total layout area smaller (not shown). Further, the master nodes 106 and the slave nodes 108 are connected via multi-stage switches 114. The connections between the master nodes and the slave nodes are much less and the wire crossing and overlapping are much reduced The present disclosure introduces building blocks to improve the overall performance of the system, as well as reduce the area of the SoC/NoC. A building block serves as the basic cell of the DSMC. A big and flat memory interconnect network is divided to a hierarchical, small and easy to be managed building blocks in a scalable and symmetric pattern to provide consistent access latency while mediate wirings and connections cross over pressure.

Building Blocks

Figure 2:
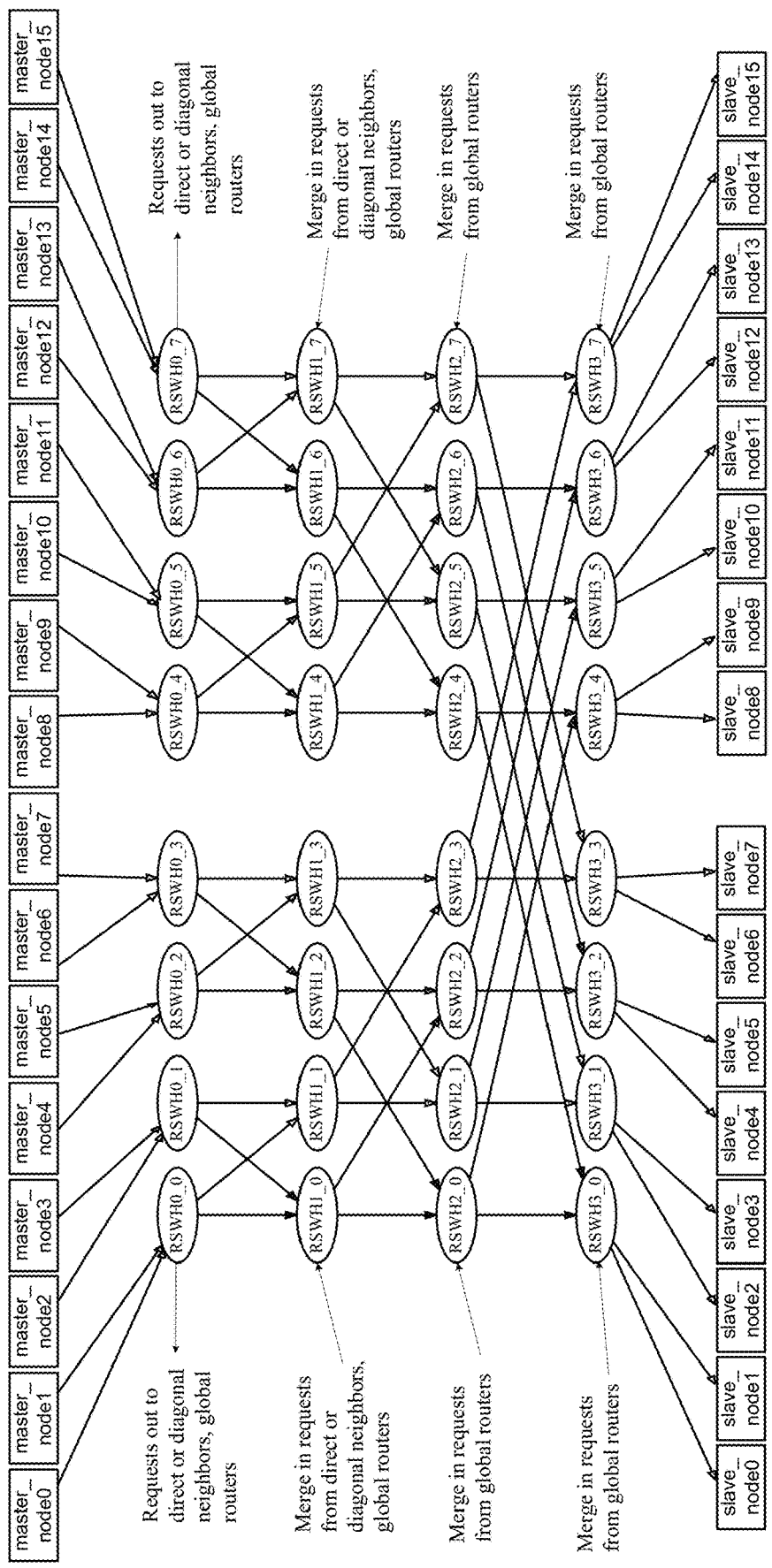
FIG. 2 is a schematic diagram of a building block with 16 master nodes and 16 slave nodes according to one embodiment of the present disclosure.

FIG. 2 is a diagram of a building block with 16 master nodes (master_node0 to master_node15) and 16 slave nodes (slave_node0 to slave_node15) according to one embodiment of the present disclosure. The 16 master nodes represent ports connected to master cores and 16 slave nodes represent ports connected to the bank controllers. The master cores may locate in the building block or outside of the building block; the bank controller controlling the memory banks usually locate in the building block. In this embodiment, the master nodes and the slave nodes are connected by four stages of radix-2 switches, i.e. RSWH0_0 to RSWH3_7. Wherein, RSWH0_0 to RSWH0_7 are level 0 (first stage) switches; RSWH1_0 to RSWH1_7 are level 1 (second stage) switches; RSWH2_0 to RSWH2_7 are level 2 (third stage) switches; RSWH3_0 to RSWH3_7 are level 3 (fourth stage) switches. That is to say, in our embodiment, the closer the switches to the master nodes, the lower level number it is. Persons skilled in the art should understand that the level number of the switches may also be named in an opposite direction. Although in the embodiment of FIG. 2, all switches are radix-2 switches, it should be understand that other number, i.e. radix-N switches, may be used here. The number N of different stages may be same or different. The number N within one stage may be same or different.

The level 0 (first stage) switches can scan the read/write command from any master connected to the input of the switches. All switches can decode it, break it and send it accordingly in parallel to the bank controllers within the same building block, neighboring building blocks, and/or global routers if the commands address a memory space of other regions. The level 0 switches can also break the raw read access commands, such as burst 4, 8, 16, to a much condensed and compressed format to avoid flooding the SoC/NoC by apply compressing techniques or the region with so many beat level commands and interpret the command appropriately with different granularity when the command targets different regions. This function consists of command scanning, scrambling, compressing and dispatching. Command scanning is responsible for raw command analyzing. Command scrambling is to evenly distribute incoming command among building blocks and/or bank controllers. Command compressing is used to compress multiple sub-commands as needed. And, command dispatching is to distribute multiple sub-commands across different building blocks.

In FIG. 2, the stage number is four, because of the number of the master or slave nodes, i.e. 16 is the radix number 2 to the power 4 ($16=2^4$). Note that here radix-2 is only one embodiment of the present disclosure, radix-4 or higher radix switches may be used between the master nodes and slave nodes. For a radix-2 connection, each two of the master nodes connect to one switch of the first stage (level 0 in this embodiment), each two of the slave nodes connect to one switch of the last stage (level 3 in this embodiment). For each radix-2 switch, there are two connections from an upper level switch or node, and two connections to a lower level switch or node.

The switches of the first stage are responsible for command outstanding management to make sure all outstanding commands are tracked and maintained properly to fully comply with interface protocol and DSMC internal operation. On the same token, they are also responsible for expecting the read return data and writing status from the same building blocks, other building blocks and global routers accordingly. The buffer size is very small since it buffers the read return data and writing status with minimum efforts. The switches of the first stage also have the capability to compress multiple beats in one request for multi-beat burst, such as 2, 4, 8, 16 and beyond, transactions to achieve highest possible command efficiency.

The second stage switches are responsible for taking in traffics from the first level switches located in the same building block, arbitrating them and routing accordingly to the next level of switches; taking in traffics from global router nearby and routing accordingly to the channel reserved for local traffics; taking in direct connections from other building blocks, arbitrating them and routing accordingly to the next level of switches via extra speed-up channels. For second stage switches, extra channels may be added depends on how many direct connections from other building blocks limited by physical routing resources available at a particular technology node. The second stage switches may also send out the return data/status to the requesting resource (may be neighboring blocks or local upper stage switch) to finish the requests they have got from the first stage switches. Note that the global router traffic may also be managed by lower stage switches. One more task for the second stage switches is to decompress requests properly at this stage. The compressed request will be split with the granularity appropriate for this level of routing and further passed donwstream to a lower stage switches or bank controller. For a radix-2 building block, the compressed request will be split by half as two requests; while for a radix-4 building block, the compressed request will be split by quarter as four requests. Each request would take different output port from this stage of switch to the next stage of switch or bank controller for further processing and handling. Note that switches of each stage, except the first stage switches, can perform the command decompressing.

The third stage switches are responsible for taking in traffics from the second stage switches located in the same building block, arbitrating them and routing accordingly to the next stage of switches or memory bank controllers; taking in direct traffics from the other building blocks, arbitrating them and routing accordingly to the next stage of switches via speedup channels. Please note, extra channels may be added depends on how many direct connections from the other building blocks and limited by physical routing resources available at a particular technology node. The third stage switches may also take in traffics from global router nearby, and route them accordingly to the next stage of switches or memory bank controllers. One more task for the third stage switches is to decompress requests properly at this stage. The compressed request will be split with the granularity appropriate for this level of routing and further passed donwstream to a lower stage switches or bank controllers. Each request would take different output port from this stage of switch to the next stage of switch or bank controller for further processing and handling. Person skilled in the art should understand that in other embodiment, other stages between the second stage and the last stage should work the same way as the third stage in the present embodiment of FIG. 2.

The last stage switches, in this embodiment, the fourth stage switches take in traffics from the upper stage switches located in the same building block, arbitrate them and route accordingly to the bank controllers; taking in direct traffics from the other building blocks, arbitrate them and route accordingly to the bank controllers via speedup channels. Please note, extra channels may be added depends on how many direct connections from the other building blocks and limited by physical routing resources available at a particular technology node. The last stage switches also take in traffics from global router nearby, and route them accordingly to the memory bank controllers. One more task for the last stage switches is to decompress requests properly at this stage, similar as the switches of the second and third stages.

To connect with the other building blocks, each of the first stage switches has connections running out to second stage switches of neighboring building blocks. Also, for each of a second stage switches, connections from neighboring building blocks are merged in. This way, the communications between the building blocks are set up. Note that here first stage and second stage are the level 0 and level 1 switches that closest to the masters. Person with ordinary skill in the art should understand that switches of other stages may be used for communication between the building blocks.

Take the advantage of simple low radix switches within the building block, direct connections from neighbor building blocks and global routers provides multiple routes to access memory by gracefully merging in the requests and branching off return data to different masters.

Figure 3:
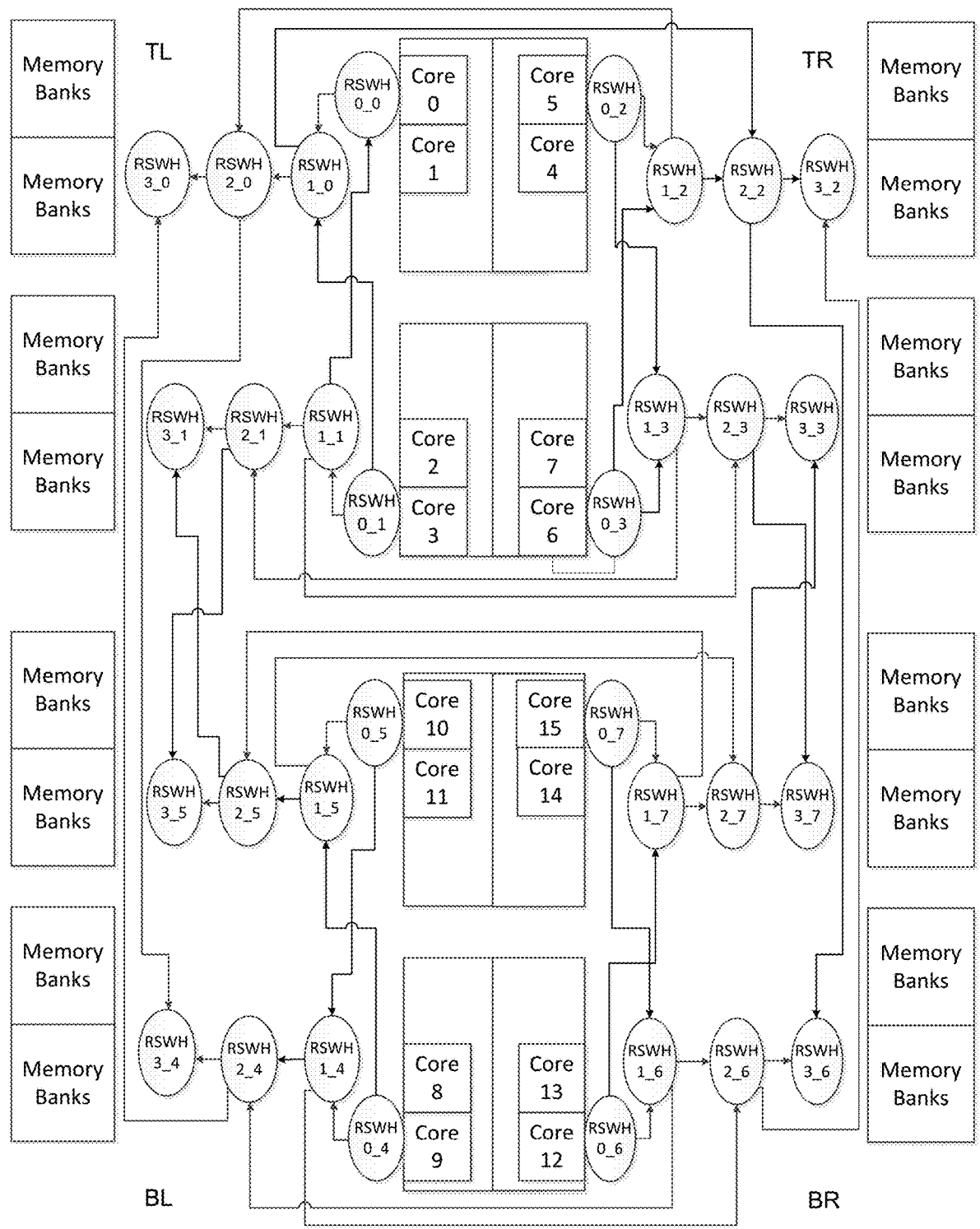
FIG. 3 is a schematic diagram of a building block having reduced wire crossing according to one embodiment of the present disclosure.

It can be seen from FIG. 2 that the most wire crossing/overlapping occurs in the connection between the radix-2 switches of the last two stages, i.e. level 2 and level 3 switches. To minimize wires cross within the building block, graph isomorphism may be applied at the very last stage to get rid of the heavy wire crossings as shown in FIG. 3. FIG. 3 is a diagram of a 16*16 (16 Masters and 16 Slaves) building block topology according to one embodiment of the present disclosure. There are 16 masters, i.e. Core 0 to Core 15 and 16 bank controllers (memory banks) connected via four stages of radix-2 switches, RSWH0_0 to RSWH3_7. Wire crossing still exists in FIG. 3; however it spreads evenly across four edges of the layout.

Figure 4:
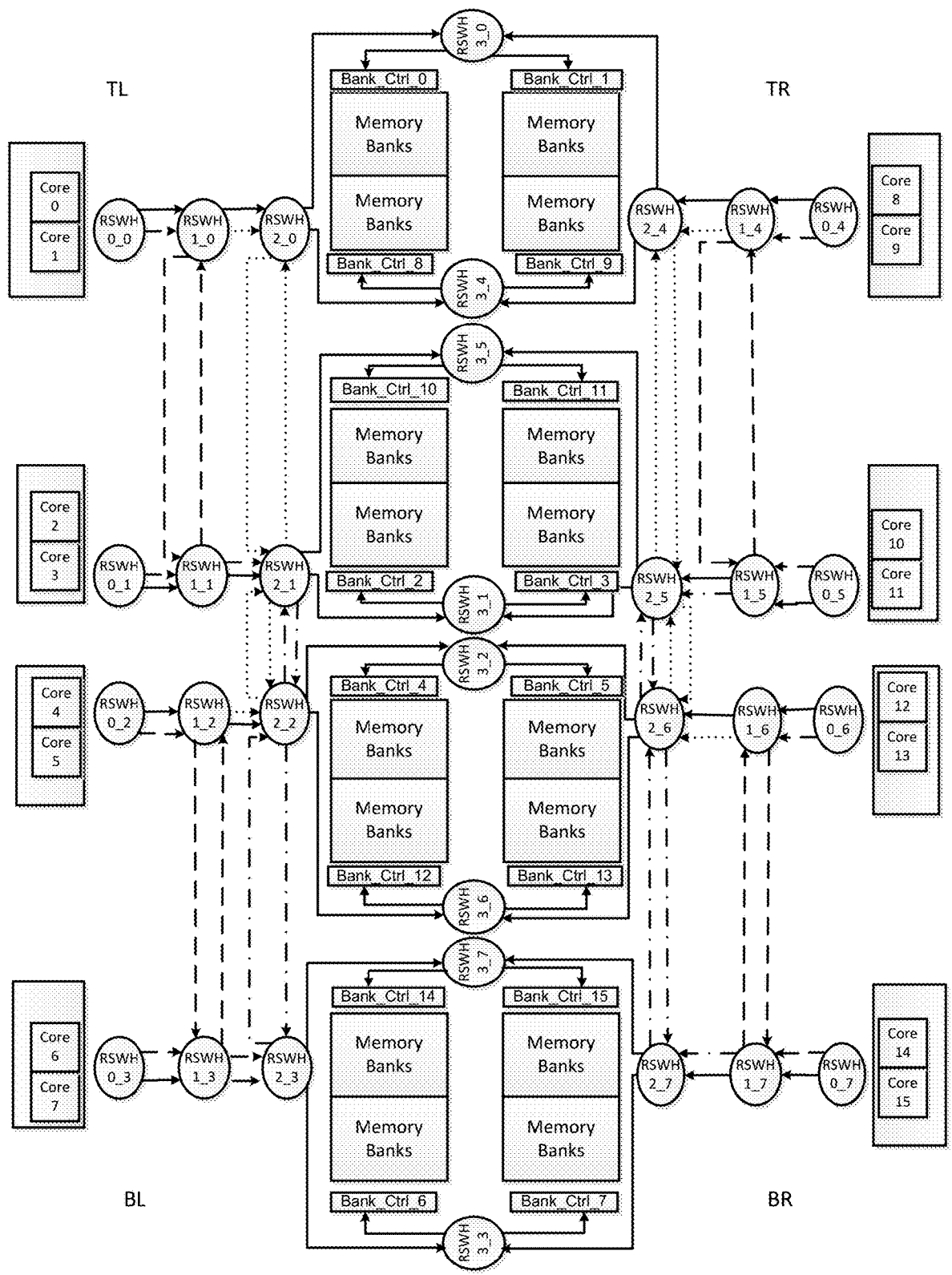
FIG. 4 is a schematic diagram of a building block having no wire crossing inside according to one embodiment of the present disclosure.

FIG. 4 is another diagram of a 16*16 (16 Masters and 16 Slaves) building block topology according to one embodiment of the present disclosure. There are 16 masters, i.e. Cores 0 to 15 and bank controllers 0 to 16 are connected via four stages of radix-2 switches, RSWH0_0 to RSWH3_7. It can be seen in the topology, all the wire crossing can be avoided after further applying graph isomorphism and make reasonable arrangement of the master cores, the bank controllers with associated memory banks and the switches. This present disclosure of the multi-stage low index radix switch implementation without or with little wire crossing can achieve much better timing (which is equivalent to the best case access latency) by breaking all-in-one flat switching fabrics to multiple stage low index switching fabrics. Not only this way of implementation could break heavily congested connections and wire crossings to an easier manageable scope, it also could accommodate many different I/O assignments and topologies. It can not only reduce the total number of wire crossings, but also spread out one heavy wire crossing stage to multiple smaller, easy managed crossings.

The building block breaks many masters and bank controllers with associated memory banks in a hierarchical manner with the consideration of the following: Self contained routings and wirings for each building block with high utilization of silicon area for further stacking up; Less routings and wirings cross over to easily merge in the read and write requests from internal traffics within the building block, direct neighbor and global routers; All the write response and read return data need to be branched off at different stage of the switches to mediate heavy data outflow from memory to different destinations.

As the fundamental element of DSMC, the building blocks should easily adapt to different topologies by putting it in multiple "joints" along the data path. For example, a 32 master DSMC can be implemented by two 16*16 building blocks connected, and wherein one or more of the 16 building blocks may be distributed by two 8*8 building blocks connected, and wherein one or more of the 8 building blocks may be distributed by two 4*4 building blocks connected, etc; a 64 master DSMC can be implemented by two 32*32 building blocks connected, wherein one or both of the two 32*32 building blocks may be distributed by two 16*16 building blocks connected, and the 16*16 building blocks can be further distributed by 8*8 building blocks or 4*4 building blocks as mentioned above.

Furthermore, the number of the master and slave in each of the building block can be equal or unequal. In one embodiment, 16 master nodes may couple to 8 slave notes or 32 slave nodes via radix-2 switches. Persons skilled in the art should understand that other radix numbers may be used to connect master nodes or slave node, for example, radix-3, radix-4, radix-5 . . . radix-N. The number N should be an integer greater than 1.

Figure 5:
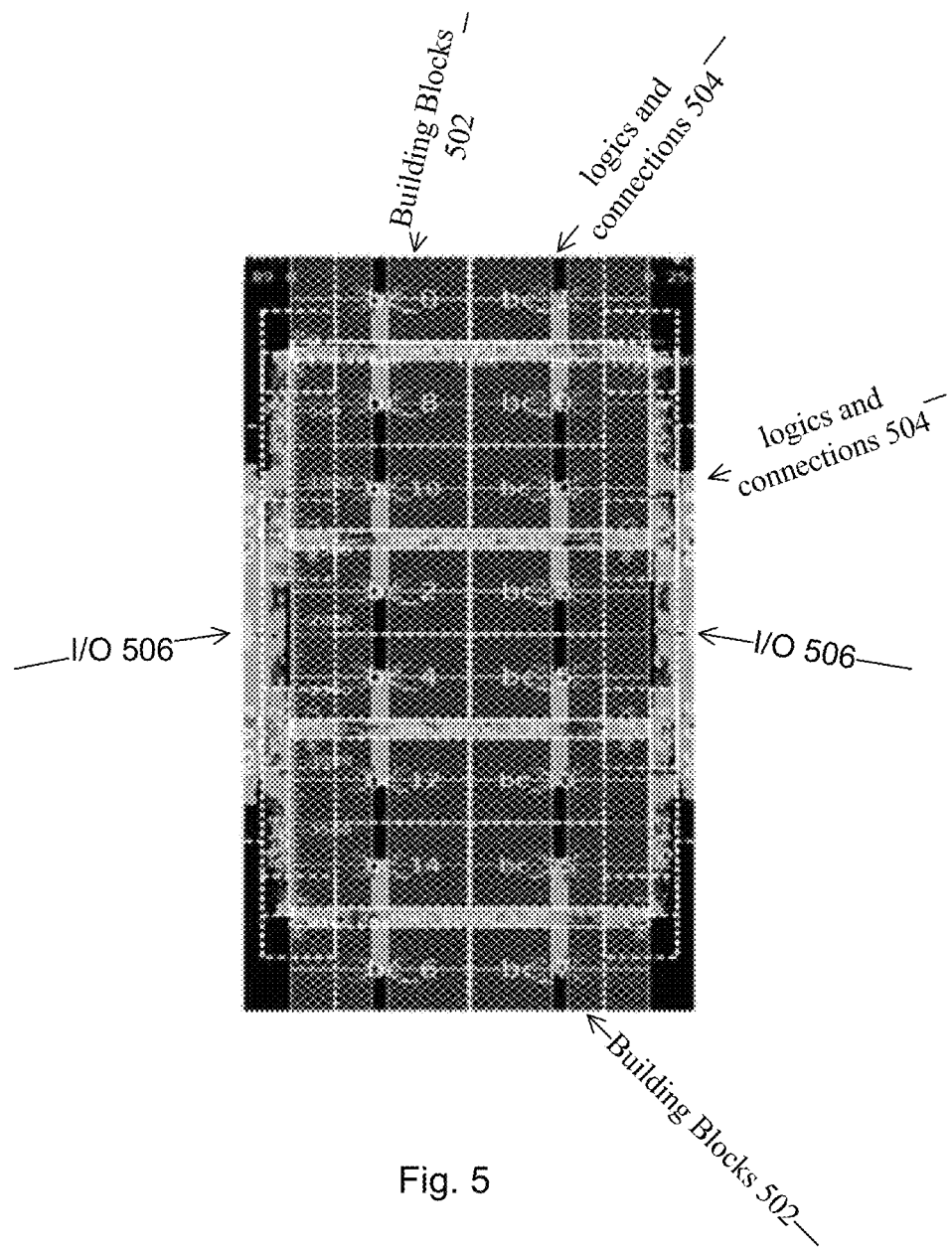
FIG. 5 is a physical layout of a 16*16 building block.

FIG. 5 shows a physical layout of a 16*16 building block according to one embodiment of the present disclosure. It can be seen how the memory banks and switches, i.e. logics and connections 504 are laid out. The two Input/Output (I/O) interface 506 shown are used to connect the building blocks 502, masters, e.g. computing element (CE), and global routers. Building block is easy to be stacked to implement a many core system. Please note, although the masters are not shown in the building block in FIG. 5, the masters may be arranged in the building block.

Figure 6:
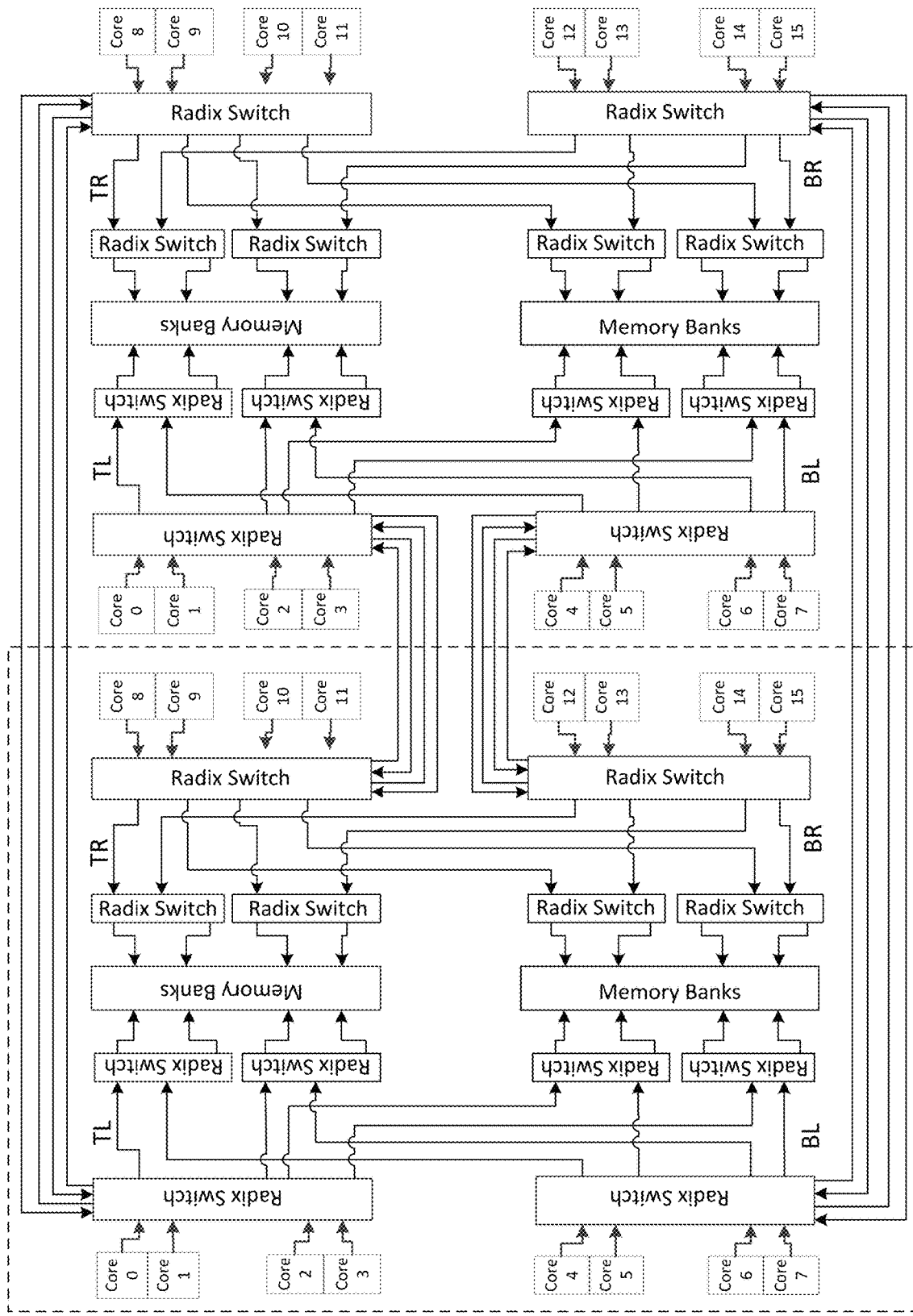
FIG. 6 is a schematic diagram of a DSMC for 32 master cores according to one embodiment of the present disclosure.

FIG. 6 is a diagram showing a DSMC for 32 master cores according to one embodiment of the present disclosure. Wherein, the DSMC is performed by connecting two 16*16 building blocks together. The last stage of switch is folded into memory banks, the penultimate stage switches are shown as two separate radix-2 switches just to emphasize that we have to have radix-2 switches at this level to enable the non-overlap wire crossings between the penultimate and the last stage of switches. Then the first two level switches are comprehended by the bigger radix switches for the simplicity of the representation. Connections run in and out from the first two stages of the switches of the first building block and connected to the first two stages of the switches of the second building block. This way, the two building blocks are stacked up and request/data can be transferred and communicated smoothly between the two building blocks.

Speedup

Conventional shared memory controller in general only has one path connecting one specific master to a specific memory bank, which we call it as 1× network. Heavy congestions among requests issued by many master are observed in the early stage of the request routing. This makes interconnection less utilized and under load. The same issue exists among multiple data returns back from memory to the requesting master. In the present disclosure, more than one hierarchical path is added between masters and memory banks and it significantly improve the overall throughput and memory utilization, thus improve the performance of the system.

Figure 7:
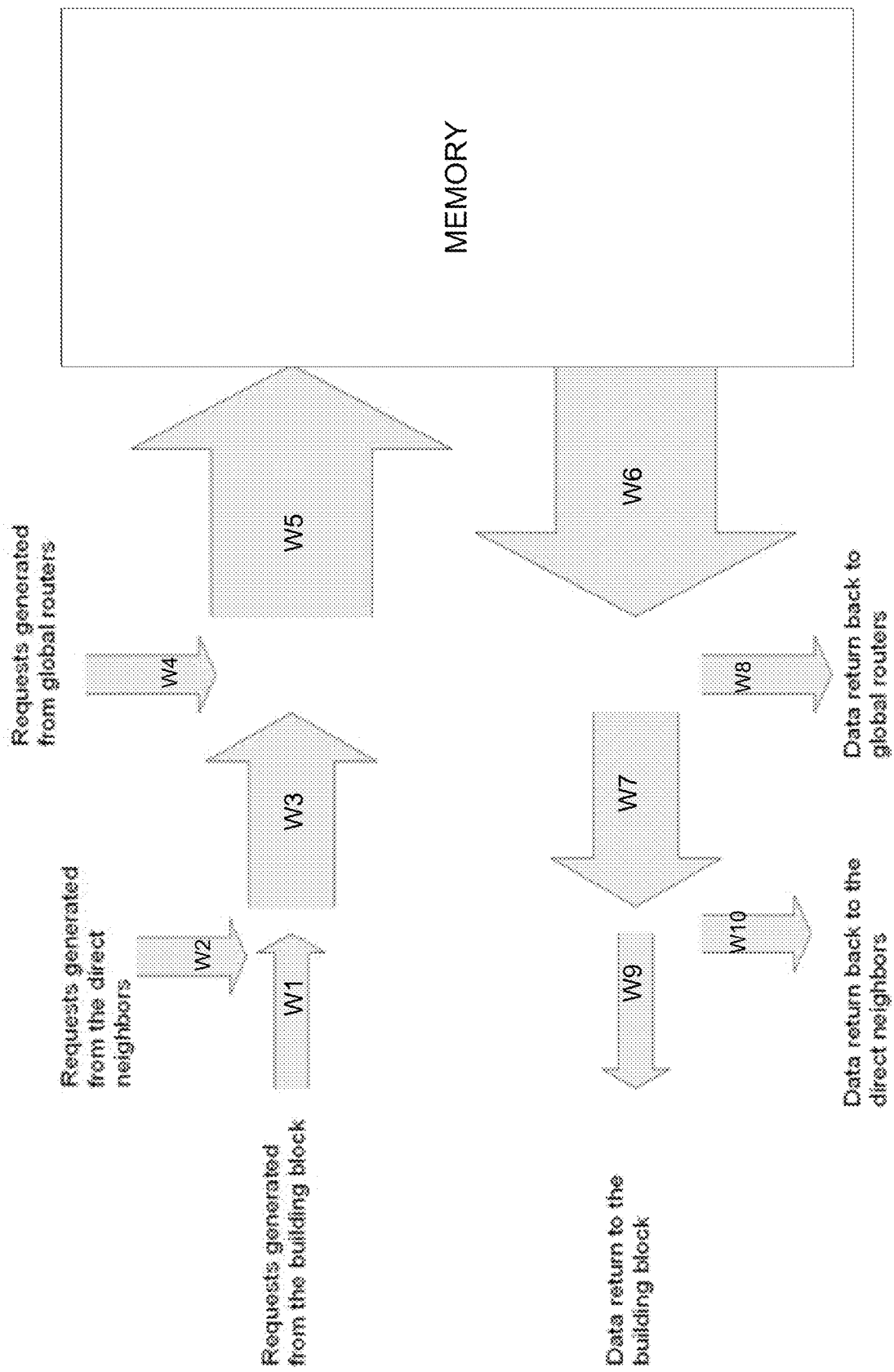
FIG. 7 is a schematic diagram showing the speedup according to the present disclosure.

FIG. 7 is a schematic showing the speedup of the system. Upper portion of FIG. 7 shows that requests or data paths expend along the infusion of the new traffic. Requests from one building block W1 and requests from the direct neighbor building blocks W2 merges together to requests W3. Further requests generated from global routers W4 joins W3 and merged together to requests W5 which connected directly to the memory. It can be seen that the closer to the memory, the more and wider the request flows are; and the more and/or wider the request flows are, the more requests can be processed simultaneously, the higher processing efficiency can be achieved with many parallel memory banks at the end.

Figure 8:
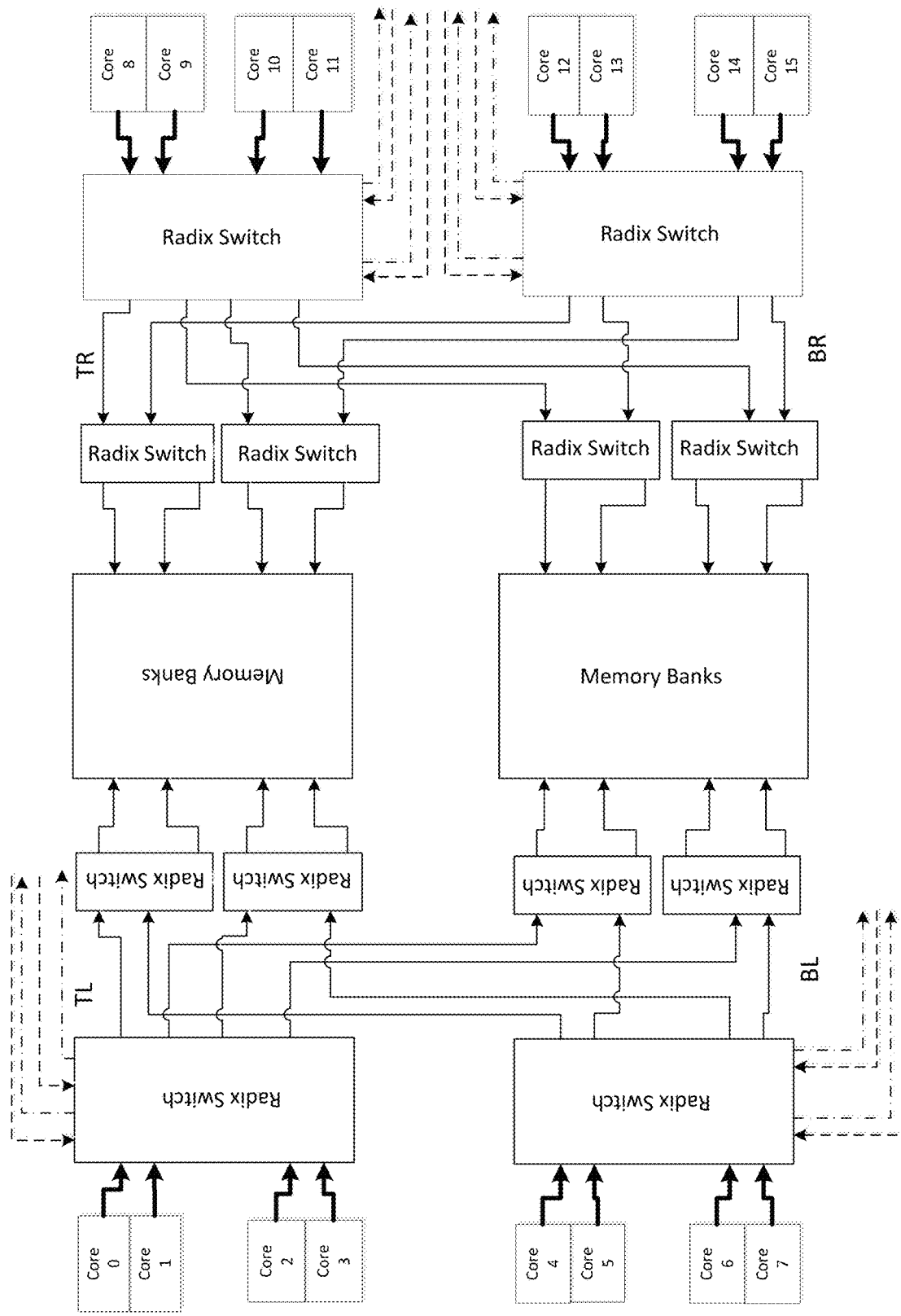
FIG. 8 is a schematic diagram showing the speedup in one 16*16 building block according to one embodiment of the present disclosure.

Lower portion of FIG. 7 shows that data paths shrink along the effusion of the return data. Data flow from the memory W6 is the widest data flow out form the memory back to the building blocks. The data flow W6 is divided into data flow W8 returning back to the global routers and data flow W7 which is further divided into data flow W9 returning to the building block and data flow W10 returning back to the direct neighbor building blocks. Similar as above, it can be seen that the closer to the memory, the more and wider the data flows are; the more and/or wider the data flows are, the more data can be processed simultaneously, the higher processing efficiency can be achieved with many parallel memory banks at the end FIG. 8 shows speedup in one 16*16 building block in DSMC design according to one embodiment of the present disclosure. FIG. 8 is actually the left portion of FIG. 6. The dot dash connections show request sent out from the building block to neighboring building blocks, global routers, etc. The dashed connections show data comes back from neighboring building blocks, global routers, etc. to the building block. The thick solid connections show the connection between the switches and local masters. They are all 1× (single) data width, i.e. implying 1× transferring rate. The thin solid connections show the inter-connection between the switches and bank controllers which is wider than 1× data width. For a 32*32 DSMC, i.e. two 16*16 building blocks stacking up, the red connections are 2× (double) data width, implying 2× transferring rate; for a 64*64 DSMC, i.e. four 16*16 building blocks stacking up, the red connections are 4× (four times) data width, implying 4× transferring rate.

Note here that the DSMC only speedup the request and/or data flow where needed. It does not arbitrarily speedup all the way from the masters. Speedup can also be implemented considering the balance between the performance and the cost.

Another problem for the conventional shared memory controller is that when there are many requesting masters to send read and write requests to the shared memory, the interconnect between requesting masters and memory banks could be heavily congested with many outstanding regular and linear memory accesses inside of the interconnect. This scenario negatively impacts the QoS of all masters and overall shared memory utilization. DSMC provides a very traffic agnostic solution to improve both memory utilization and access latency for all masters by applying scrambling algorithm inter and intra building blocks to ease access congestions among multiple masters.

Figure 9:
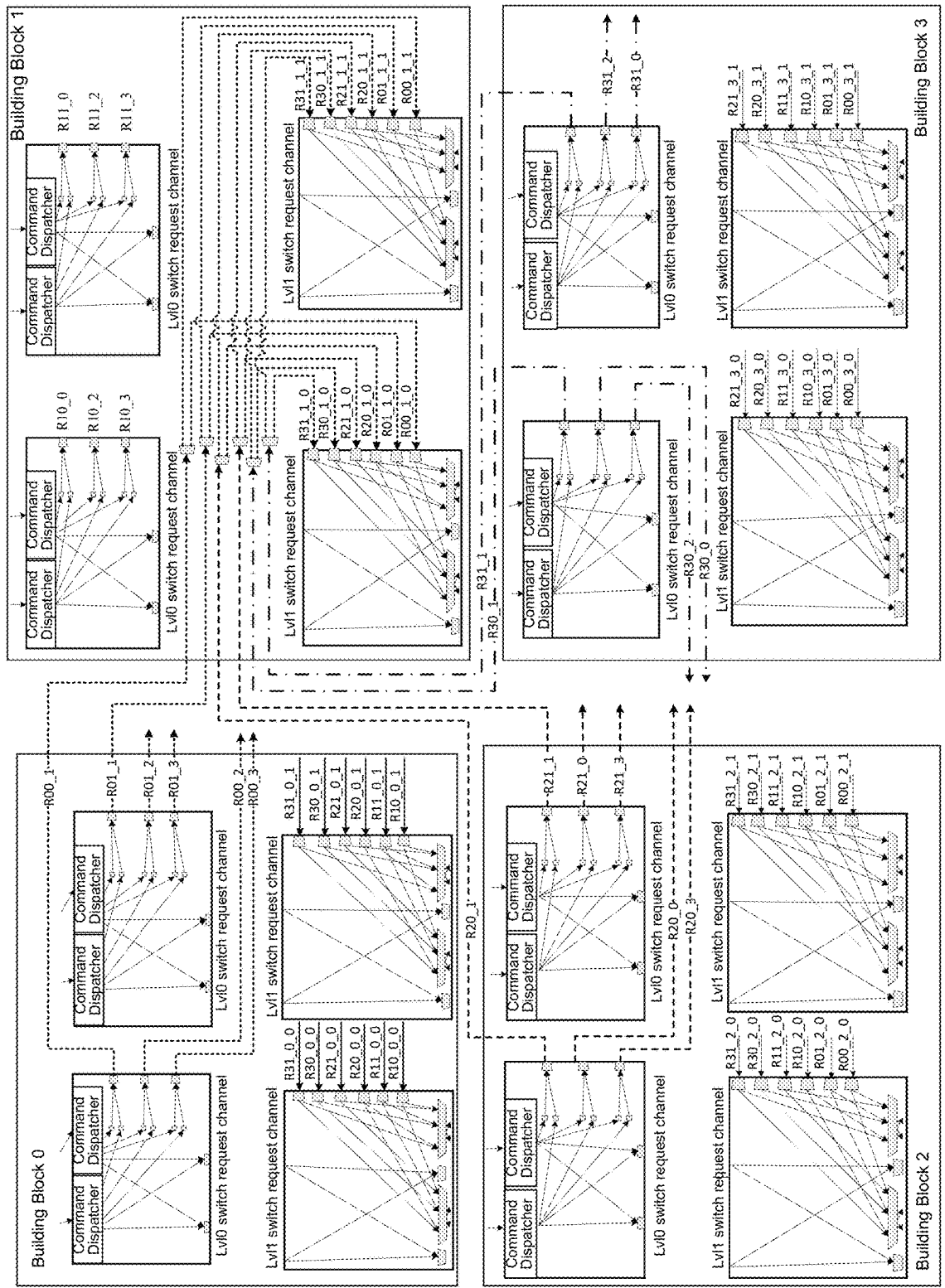
FIG. 9 is a schematic diagram showing read request handling among multiple building blocks according to one embodiment of the present disclosure.

FIG. 9 shows read request handling among multiple building blocks inside a DSMC. As shown in FIG. 9, four building blocks 0, 1, 2, 3, are stacked up. For the purpose of simplicity and clearness, note that for each building block, only two first stage switches and two second stage switches are illustrated. It should be understood that more switches may exist for each stage, and more than two stages may exist for each building block. Also, please note that only one quarter of the first and second switches is illustrated. The connections will be similar in other three quarters which are not shown.

From FIG. 9, the top left first stage switch of building block 0 has three output connections connected to the neighboring building blocks 1, 2 and 3. The first connection R00_1 connected to two second stage switching nodes of building block 1. The second connection R00_2 and the third connection R00_3 connected to two second stage switching node of building blocks 2 and 3, correspondingly (not shown). Similarly, the top right first stage switch of building block 0 has three output connections connected to the neighboring building blocks 1, 2 and 3, respectively. The first connection R01_1 connected to two second stage switching nodes of building block 1. The second connection R01_2 and the third connection R01_3 connected to two second stage switching node of building blocks 2 and 3, correspondingly (not shown).

Similarly, the bottom left first stage switch of building block 2 has three output connections connected to the neighboring building blocks 0, 1 and 3. The first connection R20_1 connected to two second stage switching nodes of building block 1. The second connection R20_2 and the third connection R20_3 connected to two second stage switching node of building blocks 0 and 3, correspondingly (not shown). Similarly, the top right first stage switch of building block 2 has three output connections connected to the neighboring building blocks 0, 1 and 3, respectively. The first connection R21_1 connected to two second stage switching nodes of building block 1. The second connection R21_0 and the third connection R21_3 connected to two second stage switching node of building blocks 0 and 3, correspondingly (not shown).

Similarly, each of the first stage switches of building block 3 also has three output connections connected to building blocks 0, 1 and 2, respectively. Also, each of the first stage switches of building block 1 should has three outputs connected to building blocks 0, 1, and 2, respectively (not shown).

In FIG. 9, each first stage switch has three neighbor outputs. Each output will be demuxed and connected to two different second stage switches in the neighbor building blocks. Although only the connections to building block 1 are detailed in the figure, one can easily infer the similar connections to the other second stage switches in other building blocks. Basically, each first stage switch has M output ports connecting to M neighboring building blocks. Each second stage switch has M*N input ports connecting to M neighboring building blocks, for a building block with radix-N switches.

Also please note that in this embodiment, the connections are one to one connection, which means that an output from one first stage switch could only connected to one building block among other three building blocks. Person skilled in the art should understand that in other embodiment multiple one to one connections could be utilized to further improve the request and data throughput if necessary with extra implementation costs.

The de-muxing logics in the receiving quarters of other building blocks could be treated as part of the top level logics within any specific building block. Also, the number of outputs from the direct neighbors could be speeded up by 3 and beyond, they could also be merged to make a speed up of 2 or less.

Figure 10:
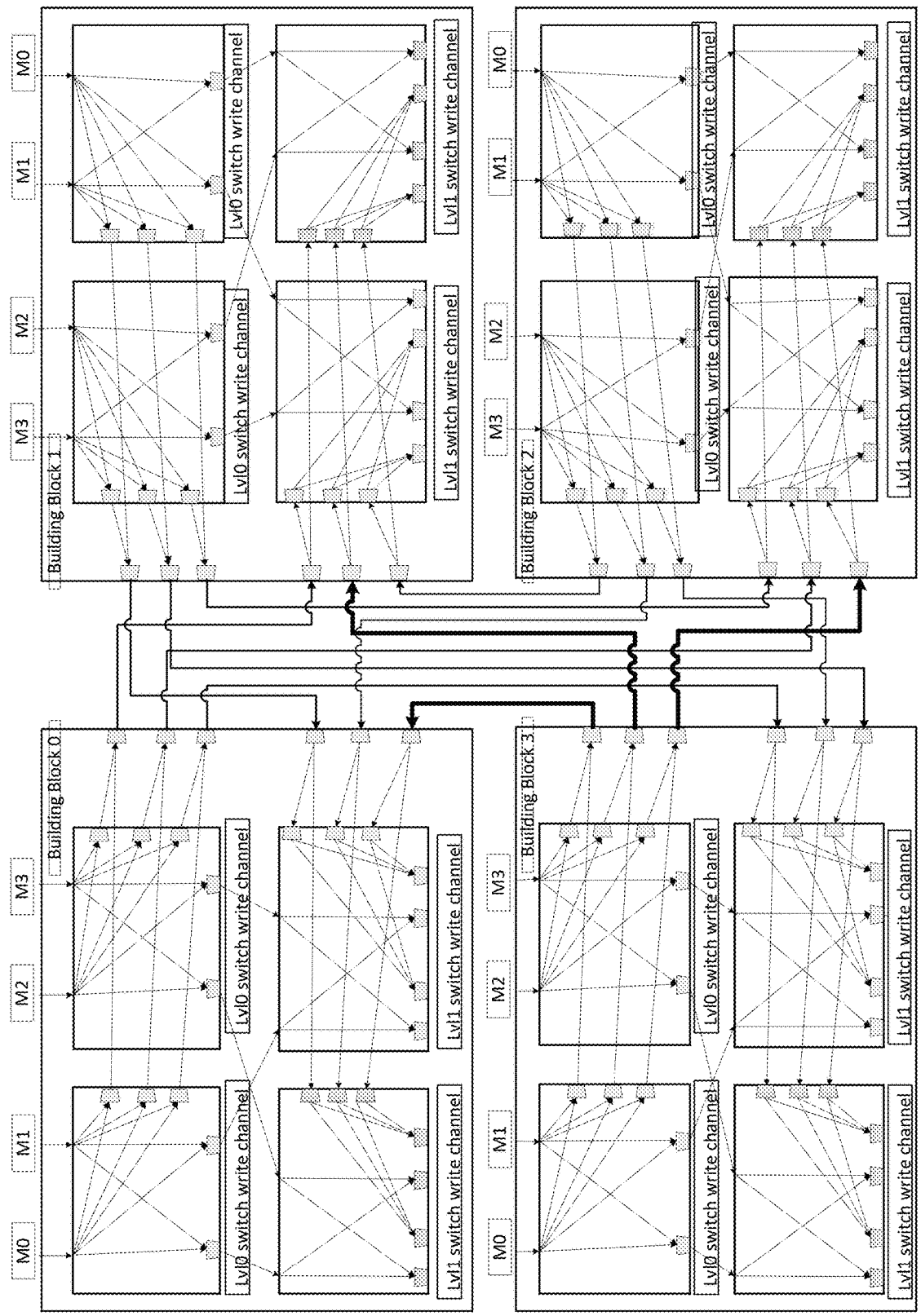
FIG. 10 is a schematic diagram showing write request handling among multiple building blocks according to one embodiment of the present disclosure.

FIG. 10 shows write request handling among multiple building blocks inside a DSMC. As shown in FIG. 10, writing side is significantly different from the read side due to the fact that there will be only one beat of data/command writing at any given clock cycle. The write channels can be merged within each quarter by half without impacting the performance too much due to the nature of low utilization and to save more costs.

As shown in FIG. 10, the top left first stage switch of building block 0 has three output connections merged with the three outputs of the top right first stage switch of the same building block. The merged three connections connect to a merged node of two second stage switches of the neighboring building block 1, 2 and 3, respectively (the dashed lines). Similar connection merging applied to building block 1 (the dot dash lines), building block 2 (the thick solid lines) and building block 3 (the thin solid lines).

FIG. 10 shows the write channel connections among four quarters (one out of each building block). The same connection scheme repeats for the rest three quarters among the multiple building blocks. The same rule applies here, i.e. the connection is always one-to-one mapping.

Memory Address Scrambling

One of the biggest challenges in many core system design is the traffic congestion. When there are many requesting masters to send read and write requests to the shared memory, the interconnect between requesting masters and memory banks could be heavily congested with many outstanding regular and linear memory accesses inside of the interconnect. Load-balance traffic is a good candidate to address this issue, because it can be traffic pattern agnostic and applied in more general cases. There are several ways to load balance traffics. The most popular way is Valiant Load-Balancing, which equally separates the traffic to multiple paths and re-converges later to the destination node. However, the prerequisite of the Valiant Load-Balancing is that it requires a full connection network, which is not applicable to all topologies. For DSMC with a highly interleaved memory bank, taking advantage of small granularity of the memory nodes is an ideal way to explore. Here we disclose a memory scrambling technique to balance the traffic. Memory scrambling technique can properly modify the target address to better use the massive memory banks available and to ease the congestion.

Again, take a 64 core system as an example, i.e. four 16*16 building blocks, as shown in Error! Reference source not found. The memory address may comprise 6 digits, most significant two bits indicating the building block ID and other four digits indicating the inter memory address. The number of the digits may be different according to the numbers of the building blocks and the numbers of the memory banks. Show in below table-1 is the address of the memory banks in the first building block, the left two digits of the binary address is the building block ID "00", the right four digits of the binary address is the memory address. For other building blocks, the building block ID may be "01," "10" or "11."

TABLE 1

Memory address of Building Block 0 without scrambling

| Decimal Address | Binary Address |
|---|---|
| 0_0 | 000000 |
| 0_1 | 000001 |

TABLE 1-continued

Memory address of Building Block 0 without scrambling

| Decimal Address | Binary Address |
|---|---|
| 0_2 | 000010 |
| 0_3 | 000011 |
| 0_4 | 000100 |
| 0_5 | 000101 |
| 0_6 | 000110 |
| 0_7 | 000111 |
| 0_8 | 001000 |
| 0_9 | 001001 |
| 0_10 | 001010 |
| 0_11 | 001011 |
| 0_12 | 001100 |
| 0_13 | 001101 |
| 0_14 | 001110 |
| 0_15 | 001111 |

Figure 11:
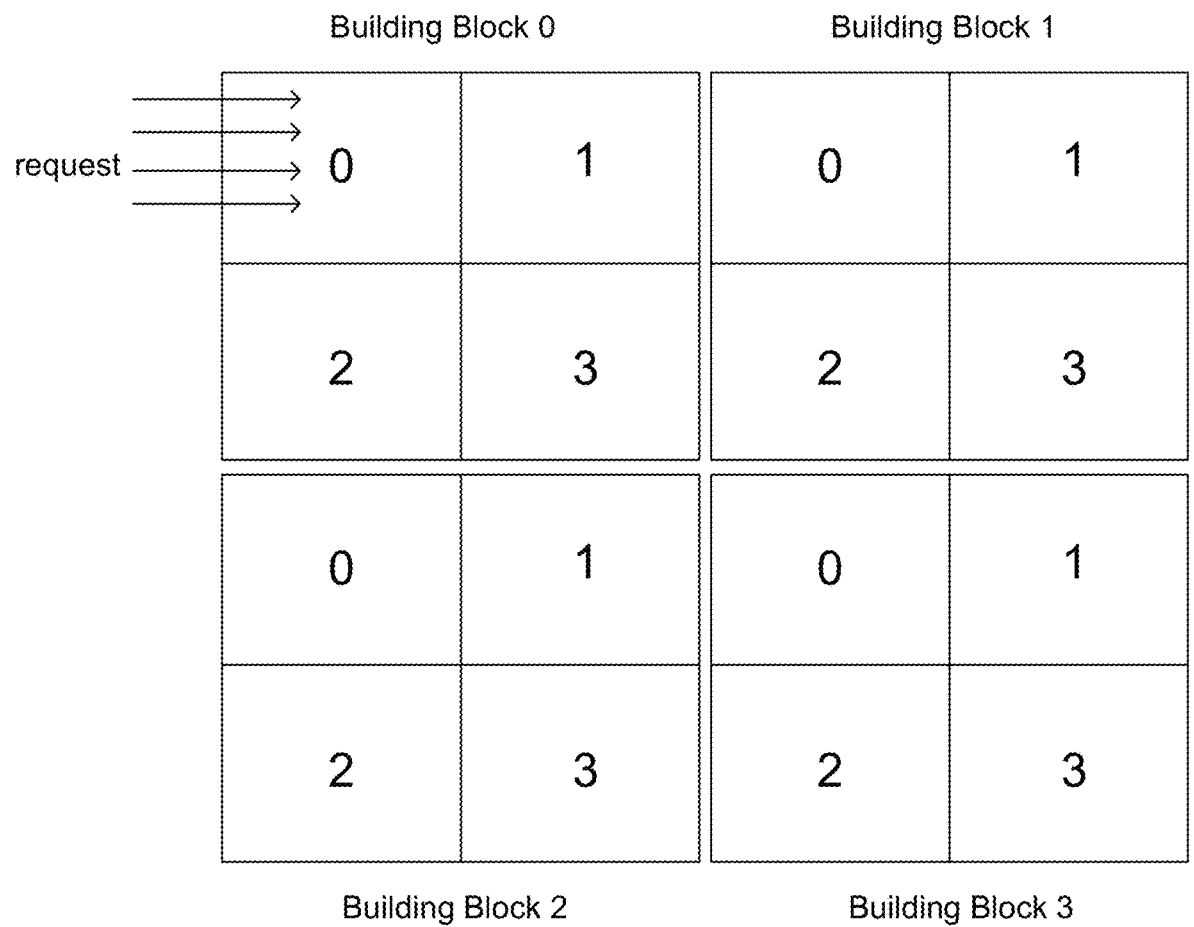
FIG. 11 is a schematic diagram showing request congestion according to one embodiment of the present disclosure.

Without scrambling of the address, if a master sends a burst four (four-beat) write request with the binary addresses of 000000, 000001, 000010, 000011, the write should all go to the first building block. Then the request is congested at the beginning of building block 0 as shown in FIG. 11. To improve the system performance and reduce the congestion, the burst four request can be distributed to four building blocks. Thus, a scramble address is needed as shown in table-2.

TABLE 2

Memory address of Building Block 0 with scrambling

| Binary Address | Scrambled Address |
|---|---|
| 000000 | 000000 |
| 000001 | 010000 |
| 000010 | 100000 |
| 000011 | 110000 |
| 000100 | 000001 |
| 000101 | 010001 |
| 000110 | 100001 |
| 000111 | 110001 |
| 001000 | 000010 |
| 001001 | 010010 |
| 001010 | 100010 |
| 001011 | 110010 |
| 001100 | 000011 |
| 001101 | 010011 |
| 001110 | 100011 |
| 001111 | 110011 |

Figure 12:
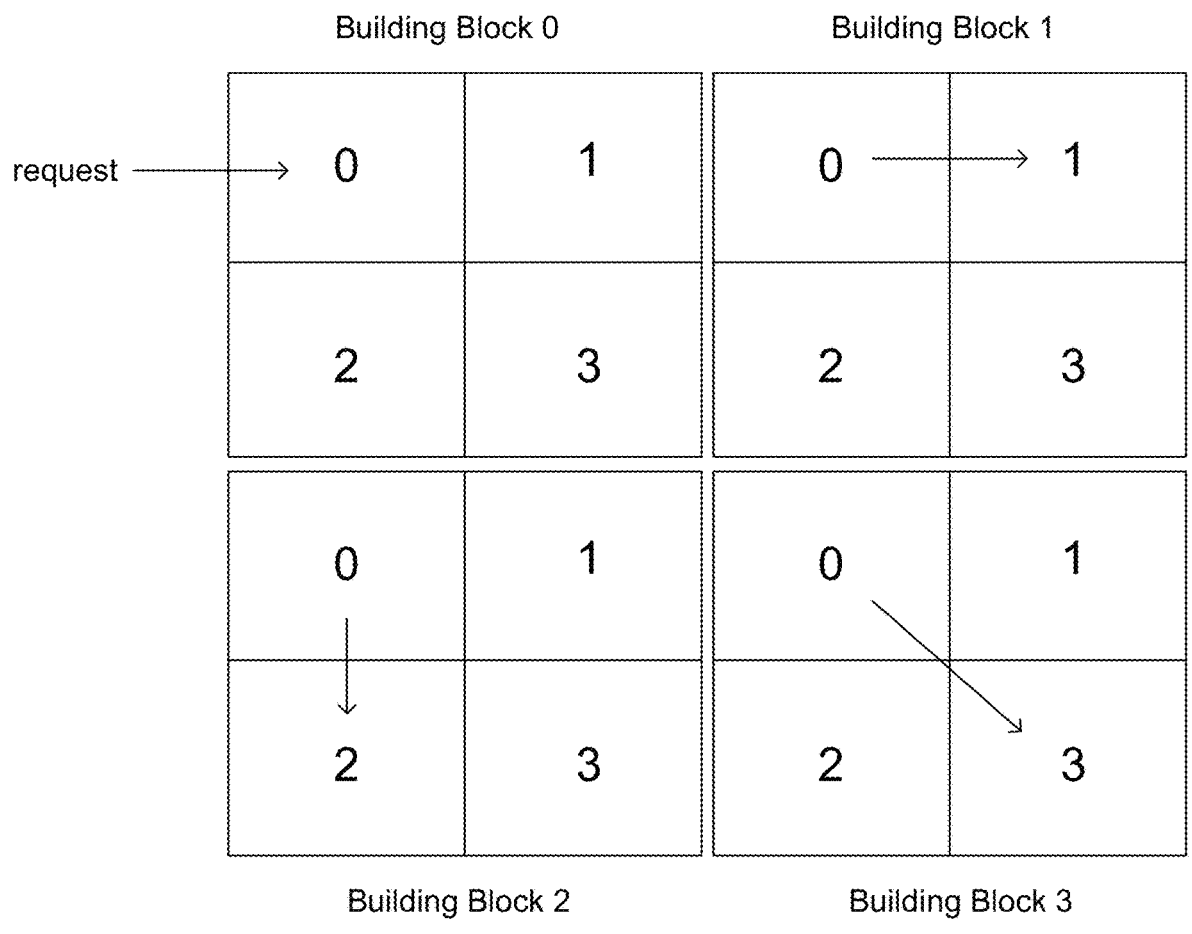
FIG. 12 is a schematic diagram showing request scrambling according to one embodiment of the present disclosure.

As shown in above table-2, the memory addresses are scrambled by moving the most right two digits (LSB, least significant bits) to the left, which can be done by a command scanner inside of DSMC. This way, for the same burst four write request with the binary addresses of 000000, 000001, 000010, 000011, the address will be scrambled by the command scanner to 000000, 010000, 100000 and 110000. The scrambled addresses are different at the left two digits (MSB, most significant bits) which indicating the building block ID. According to the scrambled addresses, the burst four write request will be evenly distributed into the four different building blocks, as shown in FIG. 12. And with scrambling, for any burst 4, 8 and 16 transactions, it would have only a quarter of traffics allocated to each of the four building blocks compared with the addresses without scrambling.

To further reduce the traffic congestion and improve the processing efficiency, the memory address inside of one building block can be further scrambled. For example, the more important the digit is, the more exchange rate of 0 and 1.

Thus, with scrambling, the system processing is more efficient. It provides structural scrambling among multiple building blocks and creates random and even traffics to all building blocks while keeping the memory map from masters' perspective as a linear one. It will make sure there is not any two memory operations access the same memory bank with every continuous n byte space, n=M*(2 to the power L)*NB, wherein M is the number of building blocks, L is the number of address bits and NB is the width of data bus. Aggressive scramble scheme with highly random and periodic scrambling inside each building block can make sure less memory access contentions to the same offset across multiple n byte space. From the simulation result, a double digits (more than 10%) memory utilization gain can be easily achieved.

As presented in this disclosure, DSMC with building block structures, connection speedup and memory address scrambling can improve the overall utilization of the system with a smaller area and almost the same power consumption compared to the conventional implementation. The DSMC is more flexible and adaptive to different I/O assignment and topologies and the system can be easily scale out with neglect-able cost.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A distributed and shared memory controller (DSMC) comprising:
   a plurality of switches distributed into a series of stages including at least a first stage of switches, a second stage of switches, and a last stage of switches, at least some switches in each stage in the series of stages being connected with one or more switches in a different stage in the series of stages via internal connections, wherein each switch in the first stage of switches connects to a corresponding switch in the second stage of switches of a neighboring building block via outward connections, and each switch in the second stage of switches connects to a corresponding switch in the first stage of switches of a corresponding neighboring building block via inward connections;
   a plurality of master ports coupled to the first stage of switches, each switch in the first stage of switches being connected to at least one of the plurality of master ports via master connections;
   a plurality of bank controllers with associated memory banks coupled to the last stage of switches, each switch in the last stage of switches connecting to at least one of the plurality of bank controllers via memory connections; and
   a command scanner coupled to the plurality of switches, the command scanner configured to scramble a request address of a read or write request received from a master core and to distribute the read or write request, with the scrambled request address, among the plurality of switches.

2. The DSMC of claim 1, wherein the plurality of switches comprises radix-N switches, and N is a power of 2 that is greater than zero.

3. The DSMC of claim 1, wherein the master connections connecting switches in the first stage of switches, the outward connections, and the inward connections have a same bandwidth, wherein the internal connections and the memory connections have a same bandwidth, and wherein the bandwidth of the internal connections and the memory connections is an integer multiple of the bandwidth of the master connections and the inward connections, the integer multiple having a value that is equal to a number of building blocks associated with the plurality of switches.

4. The DSMC of claim 1, wherein the inward connections and the outward connections merge to at least one connection.

5. The DSMC of claim 1, wherein each of the memory banks has an address comprising a building block subfield and a memory bank subfield.

6. The DSMC of claim 1, wherein the command scanner is configured to scramble the request address of the read or write request by exchanging a number of most significant bits (MSB) of the request address with a number of least significant bits (LSB) of the request address.

7. The DSMC of claim 1, wherein the plurality of switches are arranged according to a number of 2L building blocks and the command scanner is configured to scramble the request address of the read or write request by exchanging a number of L most significant bits (MSB) of a request address with the number of L least significant bits (LSB) of the request address.

8. The DSMC of claim 7, wherein the command scanner is further configured to compress a plurality of beats in the request for multi-beat burst.

9. The DSMC of claim 7, wherein the number of L LSB is further reversed after exchanging with the number of L MSB.

10. The DSMC of claim 1, wherein the DSMC comprises a plurality of building blocks, wherein each of the plurality of building blocks has a same number of master ports, a same number of memory banks and a same number of switches.

11. The DSMC of claim 1, wherein a number of the plurality of master ports is different from a number of the plurality of bank controllers.

12. A distributed and shared memory controller (DSMC) comprising:
   a plurality of switches configured to be in communication with at least one memory bank, the plurality of switches distributed into a series of stages that include at least a first stage of switches, a second stage of switches, and a last stage of switches, wherein switches in consecutives stages of switches are interconnected via internal connections, each switch in the first stage of switches connecting to a corresponding switch in the second stage of switches of a neighboring building block via outward connections, and each switch in the second stage of switches connects to a corresponding switch in the first stage of switches of a corresponding neighboring building block via inward connections; and a command scanner configured to scramble a request address of a read or write request received from a master core by exchanging a number of most significant bits (MSB) of the request address with a number of least significant bits (LSB) of the request address and to distribute the read or write request, with the scrambled request address, among the plurality of switches, wherein one or more of the plurality of switches are configured to provide the scrambled request address to the at least one memory bank.

13. The DSMC of claim 12, wherein the plurality of switches are arranged according to a number of 2L building blocks and the command scanner is configured to scramble the request address of the read or write request by exchanging a number of L MSBs of a request address with the number of L LSBs.

14. The DSMC of claim 13, wherein the read or write request includes a plurality of beats and the command scanner is further configured to compress the plurality of beats for multi-beat burst.

15. The DSMC of claim 13, wherein the number of L LSB is further reversed after exchanging with the number of L MSB.

16. The DSMC of claim 12, further comprising:

a plurality of master ports coupled to the first stage of switches; and a plurality of bank controllers with associated memory banks coupled to the last stage of switches, each of the plurality of switches of the first stage connects to at least one of the plurality of master ports via master connections and each of the plurality of switches of the last stage connects to at least one of the plurality of bank controllers via memory connections.

* * * * *